(12) United States Patent
Bao (10) Patent No.: US 6,449,630 B1
(45) Date of Patent: Sep. 10, 2002

(54) MULTIPLE FUNCTION PROCESSING CORE FOR COMMUNICATION SIGNALS

(75) Inventor: Jay Bao, Bridgewater, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/288,097

(22) Filed: Apr. 7, 1999

(51) Int. Cl.[7] .................... G06F 15/00; G06F 7/38; G06F 7/52
(52) U.S. Cl. .................... 708/603; 708/523; 708/622
(58) Field of Search ........................ 708/603, 523, 708/622, 490, 520, 632, 627, 300

(56) References Cited

U.S. PATENT DOCUMENTS

| | | | | |
|---|---|---|---|---|
| 4,546,446 A | * | 10/1985 | Machida | 708/627 |
| 4,811,267 A | * | 3/1989 | Ando et al. | 708/490 |
| 4,931,980 A | * | 6/1990 | Rault | 708/603 |
| 5,119,324 A | * | 6/1992 | Ahsan | 708/520 |
| 5,179,531 A | * | 1/1993 | Yamaki | 708/490 |
| 5,506,865 A | * | 4/1996 | Weaver, Jr. | 708/603 |
| 5,751,618 A | * | 5/1998 | Abiko et al. | 708/490 |
| 5,764,557 A | * | 6/1998 | Hara et al. | 708/603 |
| 5,904,731 A | * | 5/1999 | Matsui | 708/603 |
| 6,233,596 B1 | * | 5/2001 | Kubota et al. | 708/603 |

* cited by examiner

*Primary Examiner*—Tan V. Mai
(74) *Attorney, Agent, or Firm*—Dirk Brinkman (57) ABSTRACT

An apparatus for processing digital signals includes a multiplier having a first input and a second input and an output producing a product. An adder is connected to receive the product from the multiplier as a first input to produce a sum. A first register is connected to receive and store the sum and to provide a second input to the adder in response to a clock signal. A second register is connected to receive and store the output of the first register in response to an inverse of the clock signal to enable the addition of two products in a single clock cycle.

20 Claims, 9 Drawing Sheets

MULTIPLE FUNCTION PROCESSING CORE FOR COMMUNICATION SIGNALS

FIELD OF THE INVENTION

This invention relates generally to digital signal processing, and more particularly to a processing core that can be arranged to perform multiple complex signal processing functions.

BACKGROUND OF THE INVENTION

Rapid advancements in digital multi-media applications is presenting increasingly more difficult challenges in designing the physical layer of communication equipment. Higher bandwidth and greater data throughput require faster and more efficient modems. For example, the processing of a real-time high quality MPEG video stream at 10.76 MHz or higher is likely to require dedicated hardware. This is due to the fact that many high speed applications, such as cable and terrestrial TV modems, ADSL modems, and ATM modems have base-band processing requirements in the order of Giga operations per second. As an added complexity, multiple communication standards exist, and many more are emerging.

In the prior art, adaptability has been achieved in several ways. One technique uses software configurable hardware. For example, field programmable gate arrays can implement modems that can accommodate different modulation formats for terrestrial, cable, telephone line, satellite, and wireless communications. This is an expensive solution not suitable for mass production. In another technique, multiple carrier recovery circuits are fabricated on a single chip. A particular circuit is selected based on a given type of demodulation format. As above, cost factors detract from this solution. General purpose microprocessors have been used. However, today's high bandwidths make software solutions impractical.

In order to arrive at a particularly useful and versatile processing core, several widely used types of digital signal demodulators/receivers can be analyzed to determine commonly employed and recurring functions that are potential candidates for implementation in a processing core. In particular, various formats can respectively include receiver processing front-ends for Quadrature Amplitude Modulation (QAM)—FIG. 1, Orthogonal Frequency Division Multiplexing (OFDM)—FIG. 2, Vestigial Side Band (VSB)—FIG. 3, and Direct Sequence Spread Spectrum (DS-SS) Wideband Code Division Multiplexing (W-CDMA)—FIG. 4.

Figure 1:
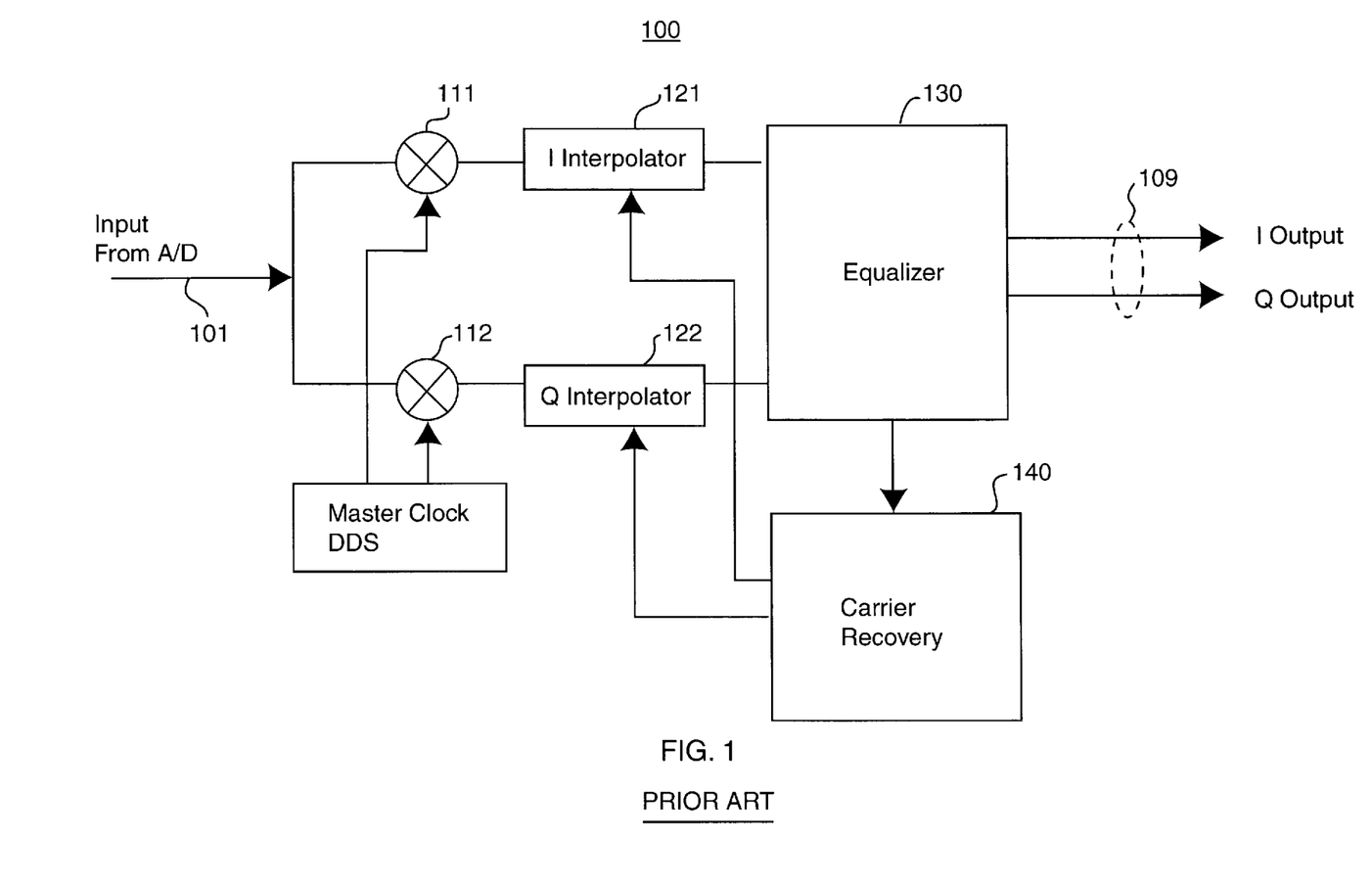
FIG. 1 is a block diagram of a Quadrature Amplitude Modulation front-end.

As shown in FIG. 1, a typical QAM demodulator front-end 100 includes two multipliers 111–112, two interpolators 121–122, an equalizer 130, and a carrier recovery circuit 140. The demodulator 100 takes a serial digital signal as input 101 and produces I and Q signals as output 109. A constant modulus algorithm is used during startup. Operating in either T or T/2 mode, the equalizer typically uses a delay line configured as complex, FIR filters with decision feed-back, feed-forward, or feed-back components having programmable lengths. Adaptive filters can have over a hundred taps requiring an equal number of terms in the computed vector products of the complex numbers.

Figure 2:
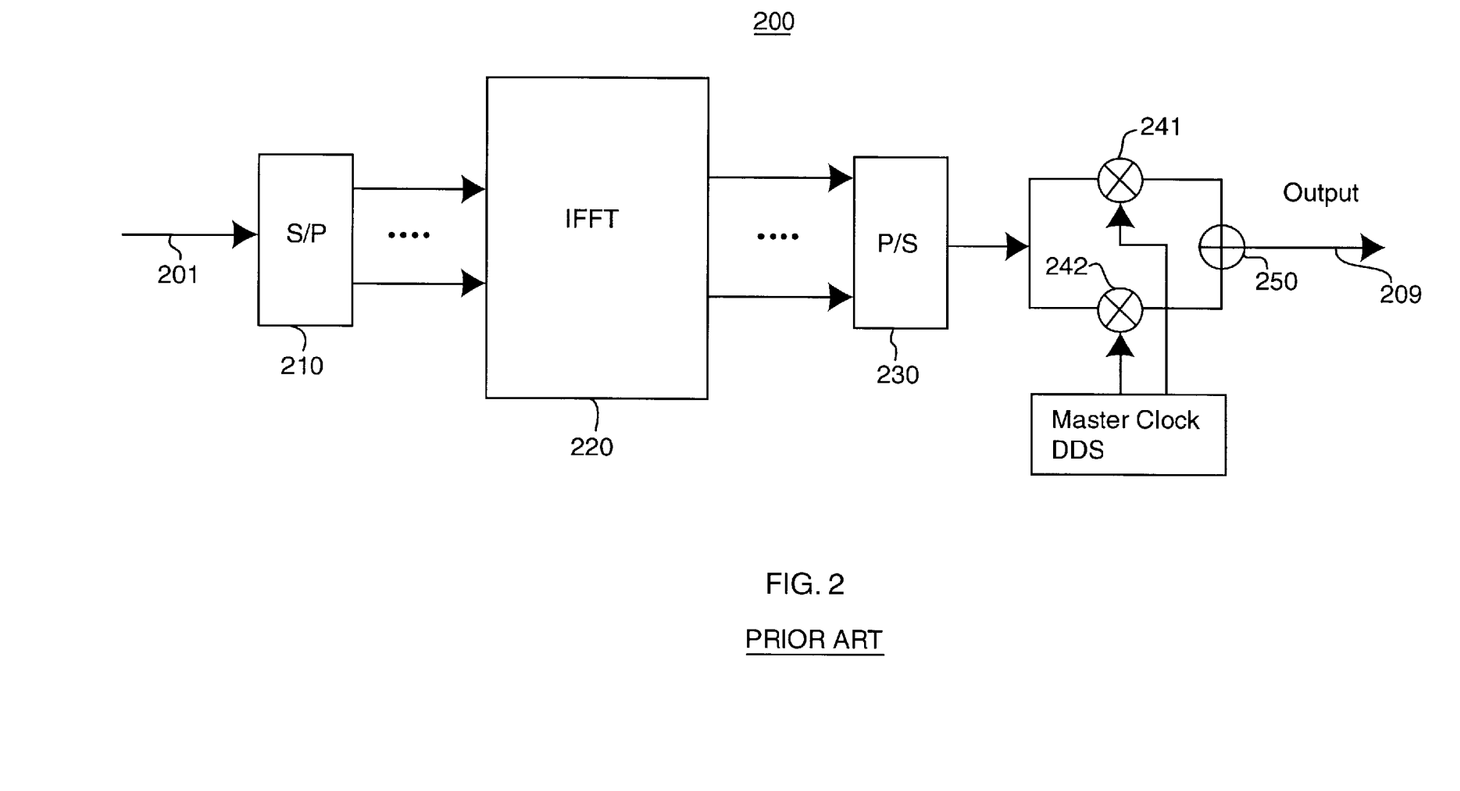
FIG. 2 is a block diagram of an Orthogonal Frequency Division Multiplexing front-end.

As shown in FIG. 2, a OFDM receiver front-end 200 can include a serial-to-parallel converter (S/P) 210, an inverse Fast Fourier Transform (IFFT) 220, a parallel-to serial converter (P/S) 230, two multipliers 241–242, and an adder 250. The receiver takes a serial signal 201 as input and generates a demultiplexed serial signal as output 209. In order to map between time and space domains, generally, $X(k)=\Sigma x(n)e^{-j(2\pi/N)}$, the FFT operates on blocks of, for example 2K or 8K terms.

Figure 3:
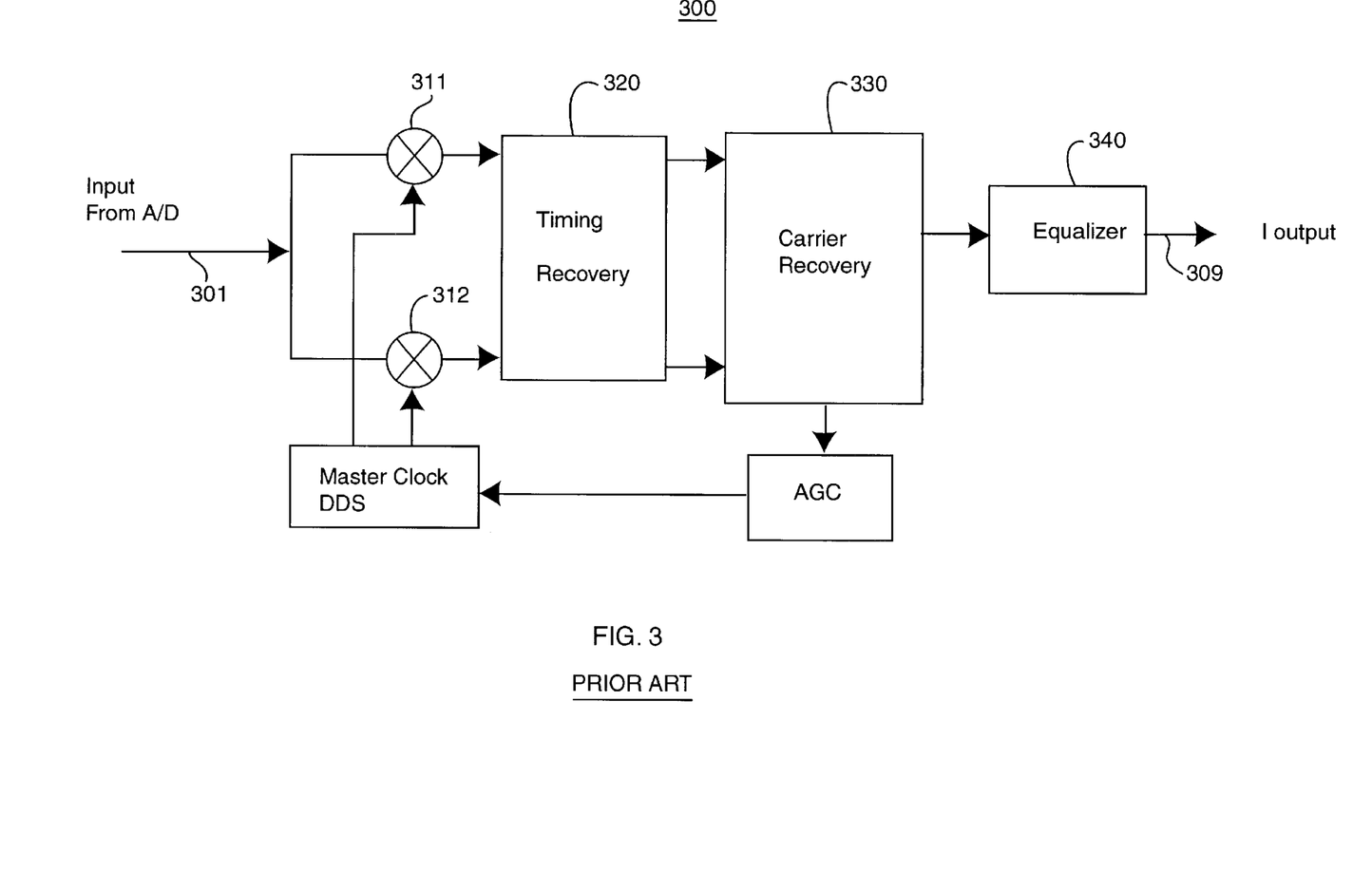
FIG. 3 is a block diagram of a Vestigial Side Band front-end.

As shown in FIG. 3, a VSB front-end 300 typically includes two multipliers 311–312, timing and carrier recovery circuits 320 and 330, and an equalizer 340. The equalizer here is similar to the QAM equalizer of FIG. 1, however, the VSB front-end uses a real mode equalizer, instead of a complex mode equalizer. In a real mode equalizer only the I-channel carries data, whereas in a complex mode equalizer, such as QAM, both the I- and Q-channels carry data. Input is provided on line 301, while the output appears on line 309. A normalized least means square method may be used for fast convergence. To realize both QAM and VSB modes, the processing core would have to switch between real and complex multiplications and additions.

Figure 4:
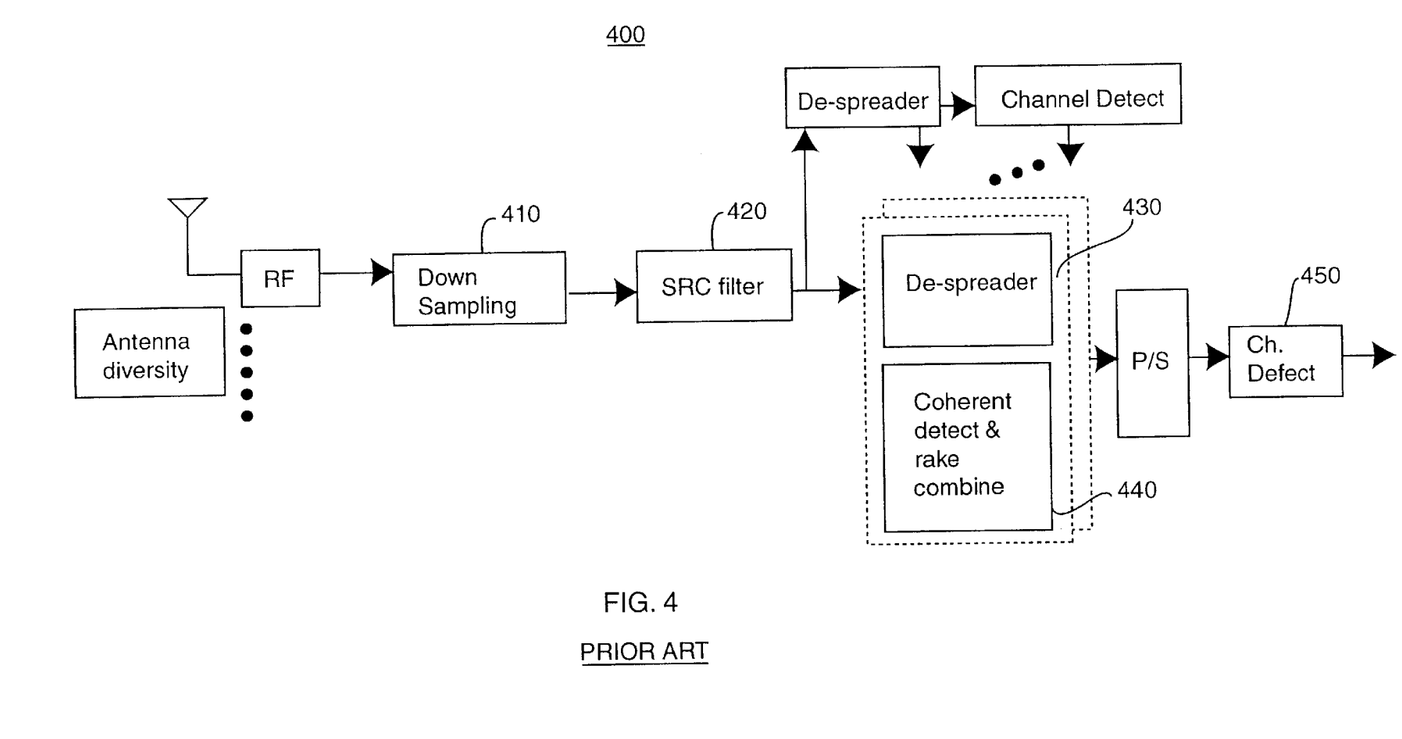
FIG. 4 is a block diagram of a Wideband Code Division Multiplexing front-end.

As shown in FIG. 4, a W-CDMA receiver front-end 400 can include a down sampler 410, a root raised cosine filter (SCR) 420, and multiple instances of a despreader 430 and a coherence detector and rake combiner 440. A spread spectrum signal is the input, and a parallel signal can be fed to a channel detector 450. The down-sampler converts the input signal to base band, the SRC performs a FIR function, and element 440 equalizes the signal.

The analysis identifies a number of basic functions that could be implemented by arrangements of a common processing core. The basic functions are summarized in Table 1. In the table, the size and width are examples of typical implementations for digital video broadcast signal processing.

TABLE 1

Basic Functions

| Function | Size | Input width |
|---|---|---|
| Vector product | 64 terms | 10 × 12 bits |
| Real FIR | 16 taps | 10-bit |
| Complex FIR | 16 taps | 10-bit |
| Adaptive FIR | 256 taps | 10-bit |
| DFFT | block size 2 k or 8 k | 10-bit |
| Direct Digital Synthesis | 2 kHz < f < 40 MHz, df – 1 Hz, SFDR – 70 dB | 10-bit |

Therefore, it is desirable to construct a fundamental multi-functional circuit module or processing core that can be arranged alone, or in multiples to handle a number of different communication signal processing functions.

SUMMARY OF THE INVENTION

In accordance with the invention, a configurable communication signal processing core includes a set of particular arithmetic units and registers which are interconnected to operate in a plurality of different basic modes suitable for use in a number of digital modem functions.

Specifically, the processing core includes a multiplier having a first input and a second input and an output producing a product. An adder is connected to receive the product from the multiplier as a first input to produce a sum. A first register is connected to receive and store the sum from the adder, and to provide a second input for the adder in response to a clock signal. A second register is connected to receive and store the output of the first register in response to an inverse of the clock signal to enable the addition of two products in a single clock cycle.

In one embodiment, the processing core is fabricated on a single semiconductor chip having externally accessible signaling pins. In addition, the core can include a first multiplexer selecting the second input for the adder, a second multiplexer selecting the first input for the multiplier, and a third multiplexer selecting the second input for the multiplier.

DETAILED DESCRIPTION OF THE PREFERRED EMBODIMENT

Processing Core Structure

Figure 5:
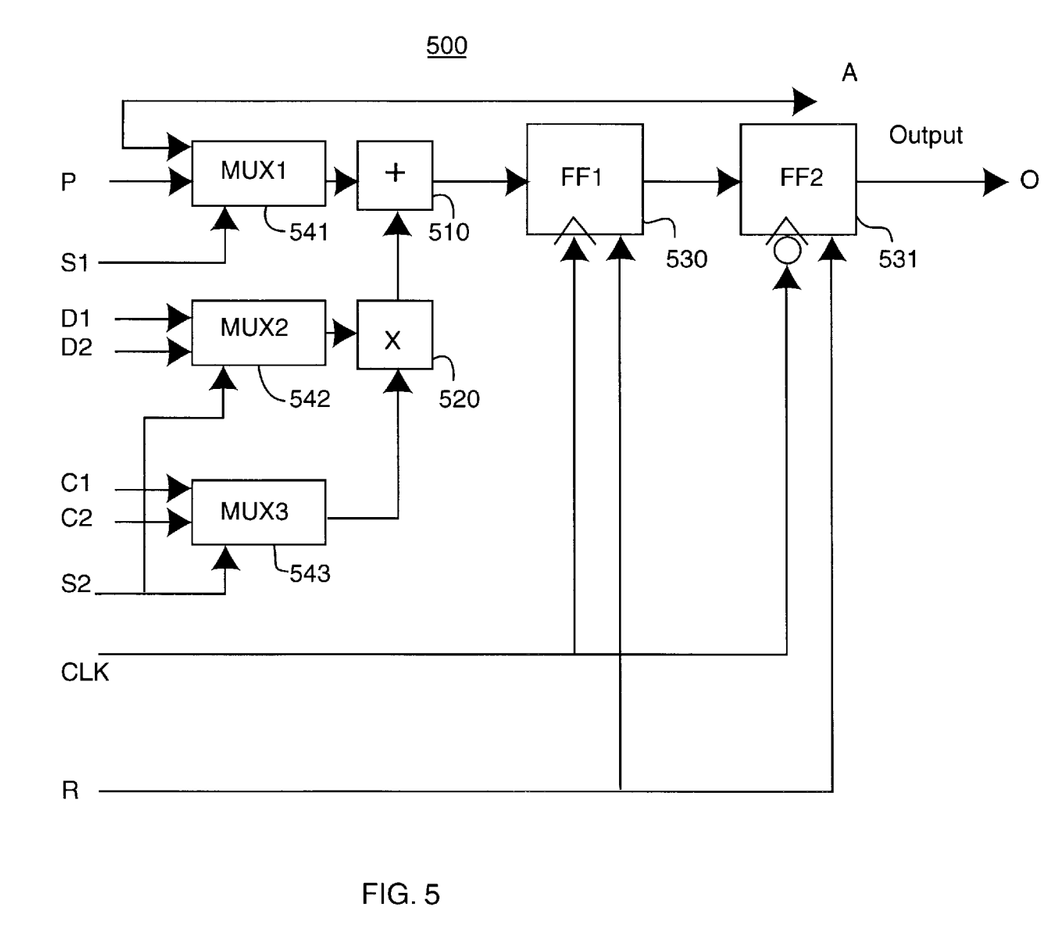
FIG. 5 is a block diagram of a multifunction processing core according to the invention.

FIG. 5 shows a multi-functional processing core 500 according to the invention. The core 500 can be arranged alone, or in multiples to handle a number of different communication signal processing functions, including the functions summarized in Table 1 above.

Fundamentally, the core 500 includes an adder 510, a multiplier 520, and two registers (FF1 and FF2) 530–531. The adder receives a first input from the multiplier, and the second input can be from register FF1. The inputs to the multiplier can be, in the case where the core is used to implement an FIR filter, data and corresponding coefficient. Register FF1 stores the result of the adder, and register FF2 stores the output of register FF1. The registers can be D-type flip-flops with enable. In the preferred embodiment, the processing core is fabricated as a single chip with external pins.

The registers are clocked by a clock signal (CLK). As a feature of the invention, the clock signal is inverted for register FF2 to achieve twice the throughput rate without doubling the clock. The registers are cleared by a reset signal (R).

Processing Core Operation

Depending on which function is implemented, a single processing core, as described above, can perform two multiply and add computations per clock cycle. For example, it is desired to perform the following arithmetic operation:

$(ab)+(cd)$

During the first half of a clock cycle, the first product (ab) is computed, and nothing is added to that result. The result is fed back to the adder via register FF1. During the second half of the clock cycle, the second product (cd) is computed, and that result is added to the previously computed product from register FF1. The final result is clocked out of register FF2 as output.

Multiple Processing Cores

Figure 6:
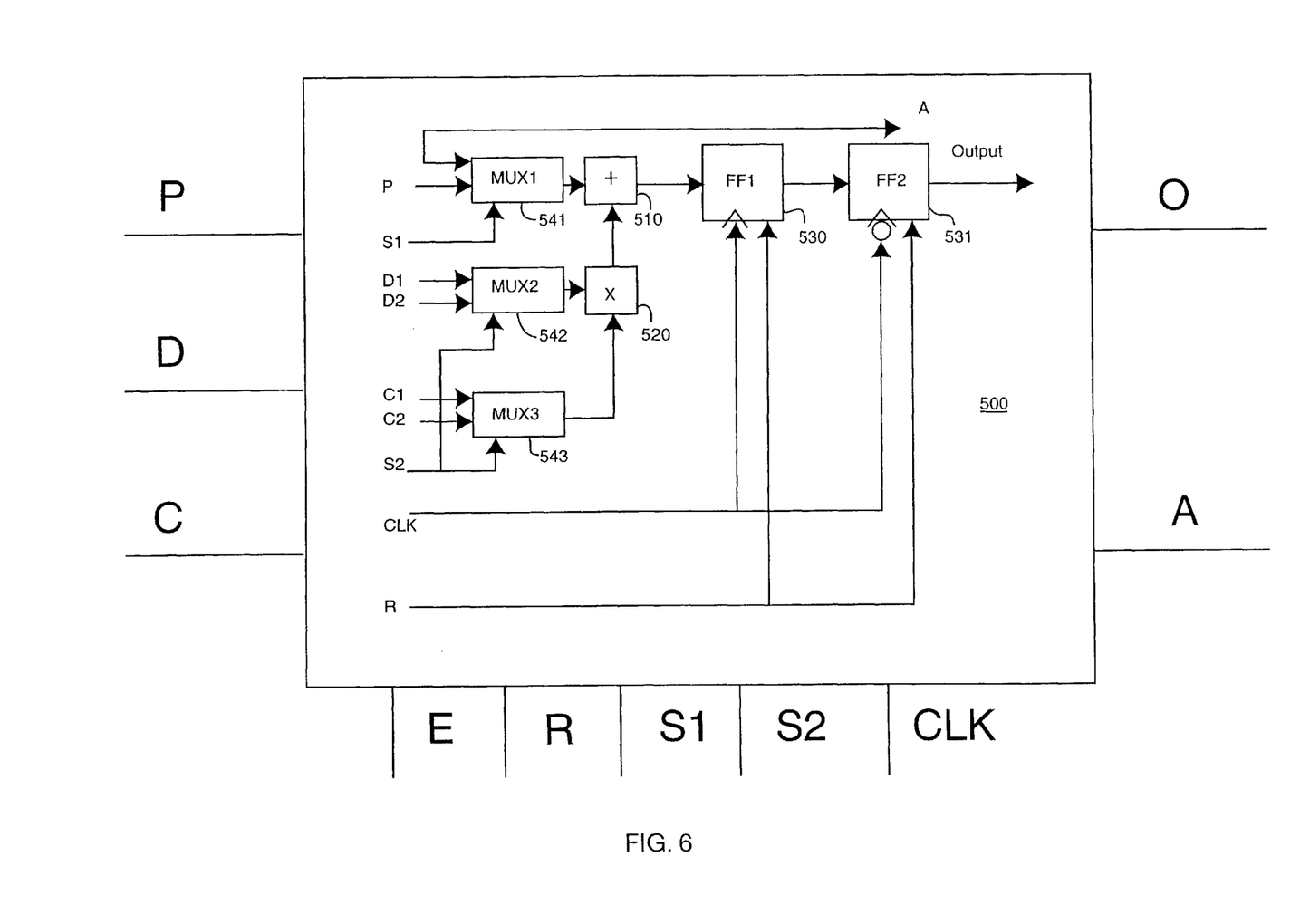
FIG. 6 is a block diagram of configurable equalizer for VSB and QAM.

In order to allow multiple processor cores 500 to be interconnected to implement the functions of Table 1, as well as many other functions, the processing core can additionally include three multiplexers 541–543. The multiplexers can facilitate signal selection. The first multiplexer 541 selects the signal to be used as the second input for the adder. The second and third multiplexers 542–543 select the input signals for the multiplier. Therefore, as shown in FIGS. 5 and 6, the core 500 includes the following pins. P for previous data, D for current data, C for coefficients, E for enabling flip-flops, R for resetting flip-flops, S1 for selecting the first multiplexer, S2 for selecting the second and third multiplexers, CLK for clocking, O for output, and A for intermediate output.

When connected together to form some signaling function, multiple cores can share a common data bus. Thus, the latency through the core will always be a fixed value, i.e., two clock cycles.

Applications for Functional Arraignments of Multiple Processor Cores

The following sections describe how the cores according to the invention can be arranged to implement the functions of Table 1.

Vector Product

As stated above, the timing recovery circuit of the interpolators of FIG. 1 needs to compute many vector product. The product of two N-dimension vectors A and B can be expressed as follows:

$$S = \sum_{i=1}^{N} A_i B_i.$$

For example, the interpolators calculate a 16 to 32 term vector product for every input sample. For base band timing recovery, the sample rate is twice the symbol rate. For 256 QAM mode, the symbol rate is 5.38 MHz, whereas for 8VSB mode, it is 10.76 MHz. The symbol rate for QPSK is variable within the range of 2 to 30 MHz. The input data A are stored in a circular buffer, and coefficients B are precalculated and stored in a ROM look-up table. To reduce the latency, parallel input of each product terms maybe necessary, especially for high input rates.

To construct a vector product, the input vector A is fed to D1, D2, and the input vector B is fed to C1, C2. Input P is tied to ground, and S1 is set to select feed-back from register FF1. S2 is set to the sample rate clock. The core will calculate two product terms and output the sum every sample period. This structure can be easily repeated to perform the calculation on all terms. An adder can sum outputs of all cores to provide the final result.

Real FIR

To implement the FIR filter, the transpose form is preferred over the direct form because then the critical path can be expressed as a simple multiply-and-add. When configured as the FIR, input P is the partial sum output from a previous core. Input data, (tap1 (D1) and tap2 (D2)), and their corresponding coefficients, (C1 and C2) are entered at symbol clock rate. Data in registers FF1 and FF2 are advanced at twice the symbol rate. The output of FF1 is fed back to MUX1 so that the output can be added to the product of tap 2. Therefore, a two-tap FIR is achieved.

As an advantage, the arrangement with cores according to the invention significantly reduces the number of gates because only one multiplier and one adder are used for the arithmetic unit. In a conventional FIR structure, twice as many arithmetic units are needed.

Complex FIR

In the QAM front-end of FIG. 1, the base band signal is in complex format. To compute a complex FIR tap at data clock cycle rate using conventional logic, four multipliers and two adders are needed:

$$(a+jb) \times (c+jd) = (ac-bd) + j(ad+bc).$$

The four multipliers calculate ac, bd, ad, and bc, respectively, and the real and imaginary parts are formed by one adder each. According to the invention, the above computation for a complex FIR can be implemented with two cores and an adder.

Adaptive FIR

Adaptive filters are building blocks for feed-forward and decision feed-back equalizers used in VSB and QAM receivers. They can be constructed using delay line FIR. Assuming an LMS update algorithm, the filter coefficients in the filter output formulation can be expressed as:

$$C_i(n+1) = C_i(n) + \mu \times (n-i) \epsilon(n).$$

Here, $C_i(n)$ is the coefficient for the ith tap at nth iteration, $\mu$ is convergence factor, and $\epsilon(n)$ is the error. For QAM mode, the coefficients are in complex form. The adaptive FIR has the same structure of the complex FIR, with half the cores dedicated to the delay line, the other half for coefficient updating.

Figure 7:
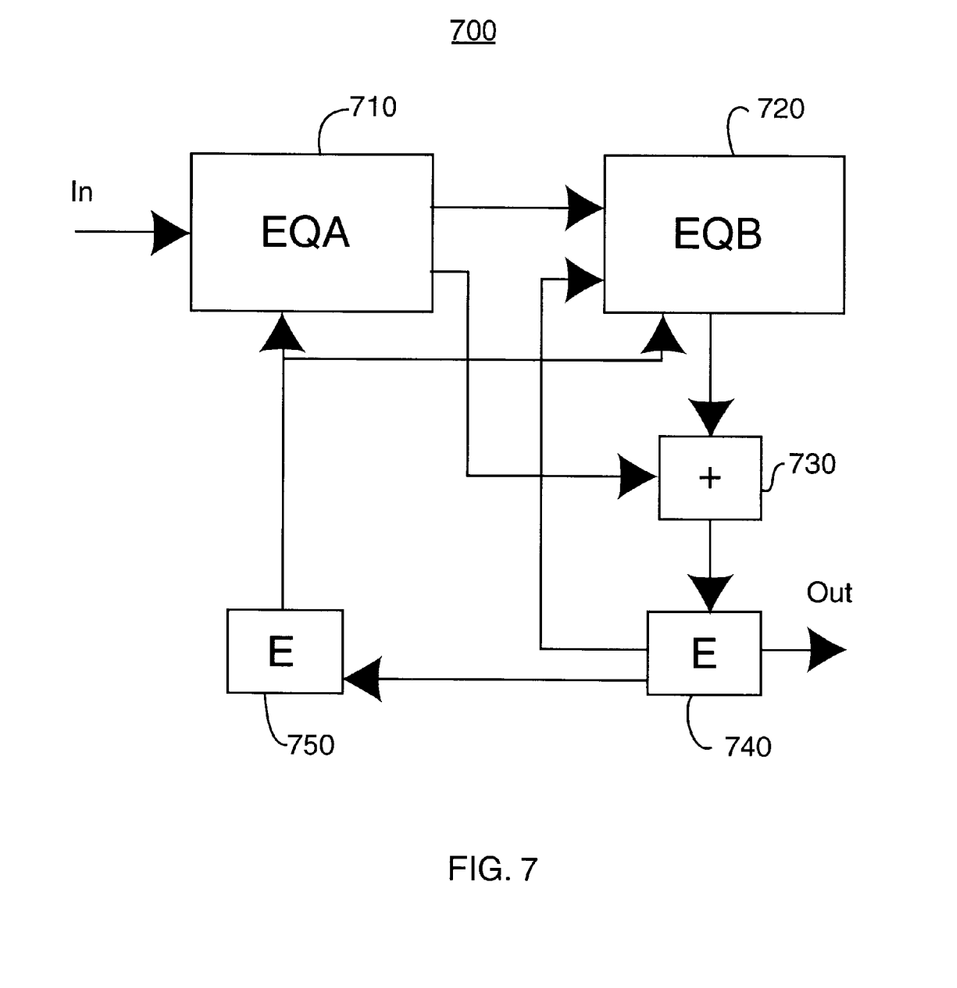
FIG. 7 is a block diagram of a circuit for calculating a fast Fourier transform.

FIG. 7 shows a decision feed-back equalizer 700 for VSB and QAM receivers. The taps of the equalizer are grouped into two parts: feed-forward (EQA) 710 and decision feed-back (EQB) 720. The output of EQA is subtracted (730) from the output of EQB, and the result is sent to the decision device (S) 740. The output of S or decision error is used to update the filter coefficients by E 750. The equalizer can also be configured as forward or backward only.

DFFT

Fast Fourier Transform (DFFT) and Inverse Fast Fourier Transform (IFFT) are key elements in modems that are based on OFDM as shown in FIG. 2. A DFT is a block transform expressed as follows:

$$X(k) = \sum_{n=0}^{N-1} x(n) e^{-j(2\pi/N)}$$

At a given time, there is a block of data currently being processed, and another block of history data. The core of the calculation portion has the same structure of a complex FIR described above.

Figure 8:
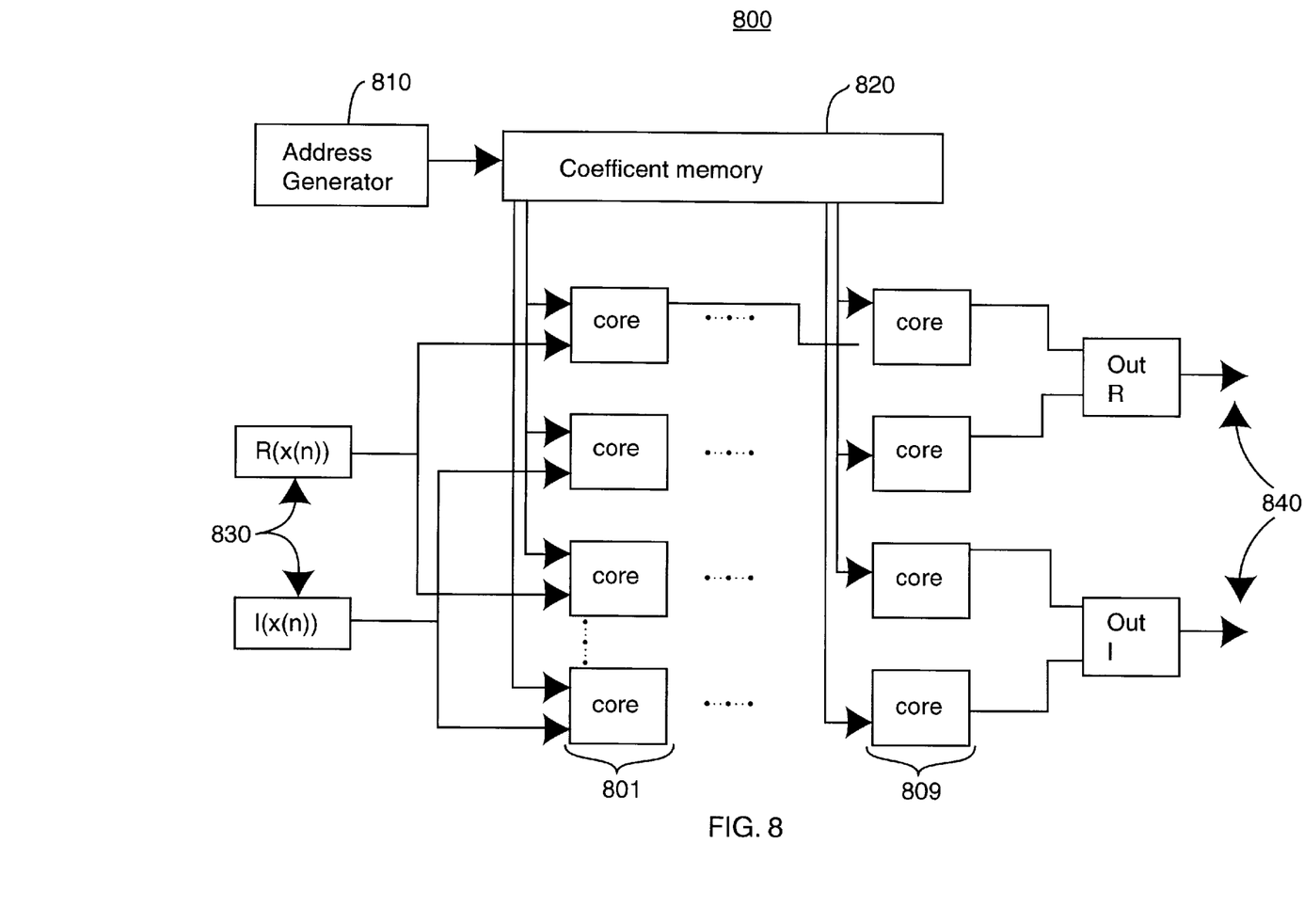
FIG. 8 is a block diagram of multiple cores for a DFFT function.

FIG. 8 shows an arrangement 800 of multiple cores to implement the DFFT function. In the arrangement 800, the cores are arranged in multiple banks 801–809, the output of cores in a previous bank forming the input to corresponding cores in a next bank. In addition to the cores, the arrangement 800 includes an address generator 810 and a coefficient memory 820. The input to the first bank are derived from $R(\times(xn))$ and $I(\times(n))$ blocks 830, and the output can be to Out_R and Out_I blocks 840.

The function of the input blocks is to generate time symmetry by shifting the input data left or right. The function of the output blocks is to generate frequency symmetry. Both pairs of blocks are implemented as bi-directional shift registers. This is realized by setting the coefficient input of the core as 1, and the P input of the core as zero.

Direct Digital Synthesis

Figure 9:
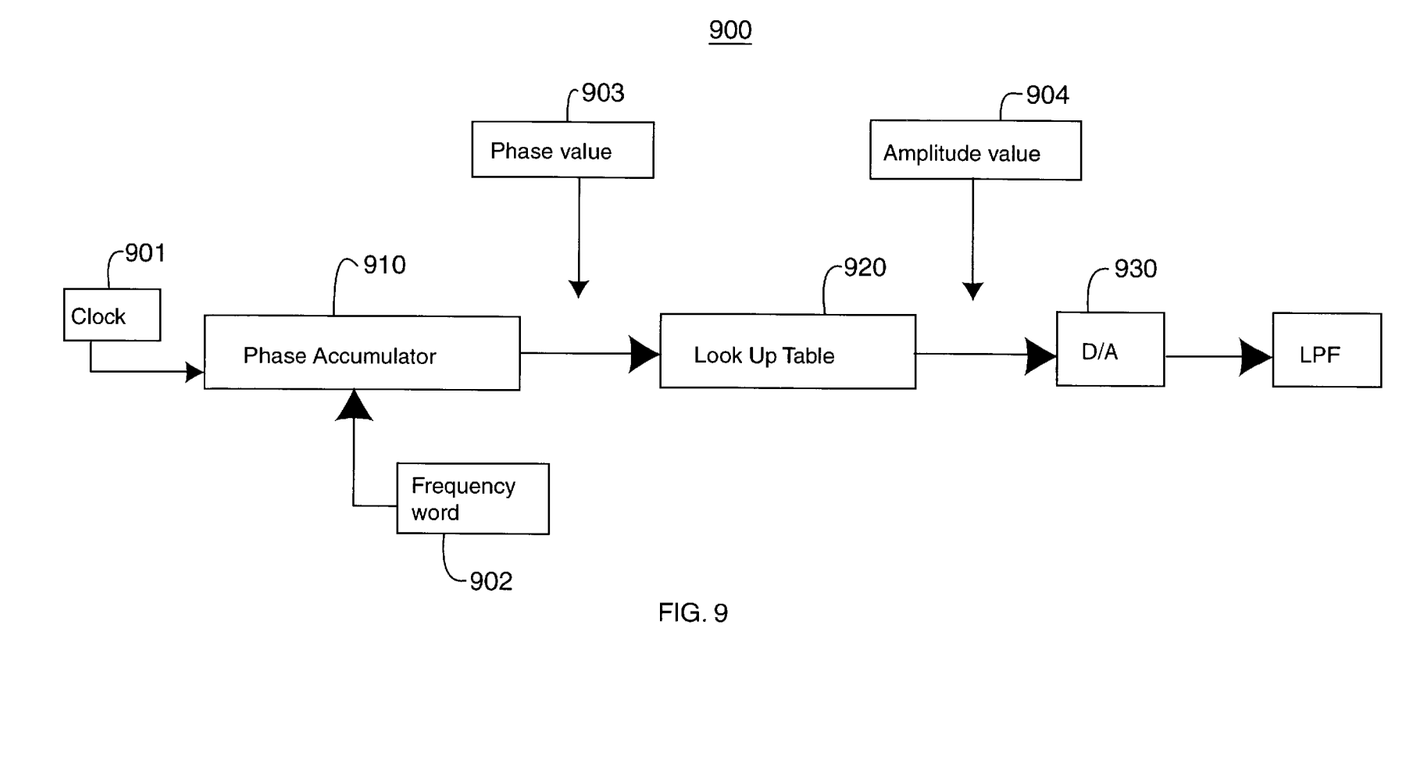
FIG. 9 is a block diagram for a direct digital synthesis circuit.

Direct digital synthesis (DDS) is a key functional block for the demodulator, including down converters and I/Q separators. A basic DDS 900 is shown in FIG. 9. The DDS includes a phase accumulator 910, a look-up table, 920, and a digital-to-analog (D/a) converter 930. A clock signal 901 and a sample are the input to the accumulator 910. Phase values 903 are provided for the look-up, and amplitude values 904 for the D/A.

A coordinate rotation algorithm can be used to generate the samples. The arrangement can be configured as columns of complex multipliers that "rotate" the input sample by $+/-2^{-k}$ radians, where k is the column number.

A highly flexible, re-configurable processing core for communication signal processing applications is described. The processing core can be used for key data path in modem function blocks. As a single chip or as an arrangement of multiple chips, the cores can be the functional building block.

While this invention has been described in terms of a preferred embodiment and various modifications thereof for several different applications, it will be apparent to persons of ordinary skill in this art, based on the foregoing description together with the drawing, that other modifications may also be made within the scope of this invention, particularly in view of the flexibility and adaptability of the invention whose actual scope is set forth in the following claims.

I claim:

1. An apparatus for processing digital signals, comprising:
a multiplier having first and second inputs producing a product;
an adder connected to receive the product as a first input producing a sum;
a first register connected to receive and store the sum and to output a second input to the adder in response to a clock signal; and
a second register connected to receive and store the output of the first register in response to an inverse of the clock signal to sum two products in a single clock cycle.

2. The apparatus of claim 1 wherein two sets of input are provided to the adder and multiplier during each single clock cycle.

3. The apparatus of claim 1 wherein the first input for the multiplier are data of communication signals, and the second input for the multiplier are coefficients of taps of a finite impulse response filter.

4. The apparatus of claim 1 further comprising:
a first multiplexer selecting the second input for the adder;
a second multiplexer selecting the first input for the multiplier; and
a third multiplexer selecting the second input for the multiplier.

5. The apparatus of claim 4 wherein the multiplier, adder, registers, and multiplexers form a processing core.

6. The apparatus of claim 5 wherein a plurality of processor cores are connected in parallel to determine a product of an N-dimensional vector A and B expressed as:

$$S = \sum_{i=1}^{N} A_i B_i.$$

7. The apparatus of claim 5 wherein a plurality of processor cores are connected in series to implement taps of a finite impulse response filter.

8. The apparatus of claim 5 wherein a plurality of processor cores are connected to each other to determine the product of a complex number $$(a+jb) \times (c+jd) = (ac-bd) + j(ad+bc).$$

9. The apparatus of claim 5 wherein a plurality of processor cores are connected in a plurality of banks to determine a block Fourier transform.

10. The apparatus of claim 1 wherein the inputs are terms to determine a vector product.

11. A method for processing digital signals, comprising:
multiplying a first input by a second input to produce a product;
adding the product to a third input to produce a sum;
storing the sum in a first register;
providing the stored sum as the third input for adding in response to a clock signal;
storing the stored sum in a second register in response to an inverse of the clock signal to sum two products in a single clock cycle.

12. The method of claim 11 wherein two sets of input are provided to the adder and multiplier during each single clock cycle.

13. The method of claim 11 wherein the first input for multiplying are data of communication signals, and the second input for the multiplying are coefficients of taps of a digital finite impulse response filter.

14. An apparatus for processing digital signals, comprising:
a multiplier configured to generate a product;
an adder configured to generate a first sum including the product;
a first register configured to store the first sum and to output the stored first sum in response to a clock signal; and
a second register configured to store the output of the first register in response to an inverse of the clock signal;
wherein the adder is further configured to generate a second sum including the output of the first register.

15. An apparatus according to claim 14, wherein the multiplier is a first multiplier, the adder is a first adder, and the clock signal is a first clock signal, and further comprising:
a second multiplier configured to generate another product;
a second adder configured to generate a third sum including the other product;
a third register configured to store the third sum and to output the stored third sum in response to a second clock signal; and
a fourth register configured to store the output of the third register in response to an inverse of the second clock signal;
wherein the second adder is further configured to generate a fourth sum including the output of the first register.

16. An apparatus according to claim 15, further comprising:
a first plurality of multiplexers configured to select inputs to the first multiplier for generating the product, and to the first adder for generating the first sum and the second sum;
a second plurality of multiplexers configured to select inputs to the second multiplier for generating the other product, and to the second adder for generating the third sum and the fourth sum;
wherein first plurality of mulitiplexers, the first multiplier, the first adder, and the first and the second registers form a first processing core, and the second plurality of multiplexers, the second multiplier, the second adder, and the third and the fourth registers form a second processing core connected to the first processing core.

17. An apparatus according to claim 16, wherein the first and the second processing cores are connectable in any of multiple selectable configurations.

18. An apparatus according to claim 16, wherein the first and the second processing cores are connectable so as to be one of connected in parallel and connected serially.

19. An apparatus according to claim 16, wherein the first and the second processing cores are connected in a first configuration to determine a vector product, a second configuration to implement taps of a finite impulse response filter, a third configuration to determine a complex number product, and a fourth configuration to determine a block Fourier transform.

20. An apparatus according to claim 14, wherein two products are summed in a single clock cycle.

* * * * *